US008851980B2

(12) United States Patent  (10) Patent No.:  US 8,851,980 B2
Versaci  (45) Date of Patent:  Oct. 7, 2014

(54) SYSTEM AND METHOD FOR CONDUCTING ONLINE VIDEO GAME TOURNAMENTS

(75) Inventor: Joe Versaci, Stow, OH (US)

(73) Assignee: Intertaintech Corporation, Toronto, ON (CA)

( * ) Notice: Subject to any disclaimer, the term of this patent is extended or adjusted under 35 U.S.C. 154(b) by 0 days.

(21) Appl. No.: 14/128,997

(22) PCT Filed: Jun. 22, 2012

(86) PCT No.: PCT/CA2012/000628
§ 371 (c)(1),
(2), (4) Date: Mar. 4, 2014

(87) PCT Pub. No.: WO2012/174656
PCT Pub. Date: Dec. 27, 2012

(65) Prior Publication Data
US 2014/0171182 A1  Jun. 19, 2014

Related U.S. Application Data

(60) Provisional application No. 61/500,864, filed on Jun. 24, 2011, provisional application No. 61/599,211, filed on Feb. 15, 2012.

(51) Int. Cl.
*G07F 17/32* (2006.01)
*A63F 13/30* (2014.01)

(52) U.S. Cl.
CPC ..................................... *A63F 13/12* (2013.01)
USPC ........ 463/25; 463/1; 463/10; 463/12; 463/29; 463/43

(58) Field of Classification Search
USPC ..................... 463/1, 10, 12, 29, 43
See application file for complete search history.

(56) References Cited

U.S. PATENT DOCUMENTS 5,961,386 A  10/1999  Sawaguchi
7,050,889 B2  5/2006  Bonilla et al.
(Continued)

FOREIGN PATENT DOCUMENTS

CA    2637169      8/2007
WO    WO 98/51384  11/1998
WO    WO 01/85277  11/2004

OTHER PUBLICATIONS

SkiJunkie, "SkiJunkie's Unofficial Blood Bowl", htt://www.worldinfocus.net/FUMBBL/javabbowl/Articles/Introduction.html, Feb. 8, 2005, pp. 1-7.
(Continued)

*Primary Examiner* — Pierre E Elisca
(74) *Attorney, Agent, or Firm* — Kagan Binder, PLLC

(57) ABSTRACT

The present invention is a system and method for conducting online video game tournaments involving a series of levels. The system comprises a tournament server connected to a communications network that is in electronic communication with remotely located players who register for the tournament. The server maintains a record of registered players competing in the tournament indicating at which level each player is eligible to play and, after players indicate they are ready to play a match, the server matches players who are ready to play at the same level. This matching may be repeated at regular intervals. After being matched, players play a match and the results are reported back to the server which may award prizes or allow players to unlock other levels based on the results. In general, a player who wins a pre-defined number of matches is a row wins a grand prize.

20 Claims, 3 Drawing Sheets

(56) References Cited

U.S. PATENT DOCUMENTS

| | | |
|---|---|---|
| 7,627,680 B2 | 12/2009 | Hutcheson et al. |
| 7,867,093 B2 | 1/2011 | Wright |
| 2003/0003997 A1 | 1/2003 | Vuong et al. |
| 2005/0266925 A1 | 12/2005 | Hornell et al. |
| 2006/0128453 A1* | 6/2006 | Hoffman ............. 463/12 |
| 2006/0258463 A1 | 11/2006 | Cugno et al. |
| 2007/0077994 A1 | 4/2007 | Betteridge |
| 2007/0099703 A1 | 5/2007 | Terebilo |
| 2007/0173323 A1 | 7/2007 | Johnson et al. |
| 2007/0265092 A1 | 11/2007 | Betteridge |
| 2007/0265718 A1 | 11/2007 | Graepel et al. |
| 2008/0026839 A1 | 1/2008 | Alringer |
| 2008/0064488 A1 | 3/2008 | Oh |
| 2008/0254893 A1 | 10/2008 | Patel et al. |
| 2008/0280663 A1* | 11/2008 | Shar et al. ............. 463/10 |
| 2009/0005150 A1 | 1/2009 | Haveson |
| 2009/0280894 A1 | 11/2009 | Kobayyashi et al. |
| 2009/0291764 A1 | 11/2009 | Kirkman et al. |
| 2010/0004055 A1 | 1/2010 | Gormley et al. |
| 2010/0022289 A1 | 1/2010 | Menicou |
| 2010/0227693 A1 | 9/2010 | Umaki et al. |
| 2012/0122562 A1* | 5/2012 | Terry ............. 463/25 |

OTHER PUBLICATIONS

Poker Office 5.5/Poker Software, pokercalculatorreport.com, Jul. 28, 2010, pp. 1-4.

* cited by examiner

208

Tournament Search - Live Series Tournament Management- Page 2

| Date / time | Activity | |
|---|---|---|
| 12/12/12 12:00 EST | Joined Tournament | — 209 |
| 12/12/12 12:00 EST | Level 1 - Matched with bubba - Match # 12345 | |
| 12/12/12 12:00 EST | Level 1 - Match # 12345 cancelled by bubba | |
| 12/12/12 12:00 EST | Level 1 - Matched with fred - Match # 12346 | |
| 12/12/12 12:00 EST | Level 1 - Match # 12346 defeated by fred | — 200 |
| 12/12/12 12:00 EST | Joined Tournament | — 201 |
| 12/12/12 12:00 EST | Level 1 - Matched with John - Match # 12347 | — 202 |
| 12/12/12 12:00 EST | Level 1 - Match # 12347 won against john | — 203 |
| 12/12/12 12:00 EST | Level 1 - Unlocked level 2 | — 204 |
| 12/12/12 12:00 EST | Level 2 - Matched with greg - Match # 12348 | |
| 12/12/12 12:00 EST | Contacted Support | |
| 12/12/12 12:00 EST | Support Award Level 2 -> no show | |
| 12/12/12 12:00 EST | Level 2 - Unlocked level 3 | — 205 |
| 12/12/12 12:00 EST | Level 3 - Matched with Brad - Match # 123479 | |
| 12/12/12 12:00 EST | Level 3 - Match # 12349 defeated by Brad | — 206 |
| 12/12/12 12:00 EST | Level 3 - Unlocked level 1 - Consolation | — 207 |
| 12/12/12 12:00 EST | Level 1 - Matched with Sven - Match # 12380 | |

[ Cancel Current Match ]  [ Award Current Match ]  [ Set Match as Defeated ]

FIG. 2

SYSTEM AND METHOD FOR CONDUCTING ONLINE VIDEO GAME TOURNAMENTS

RELATED APPLICATION

This application claims the benefit from International Application No. PCT/CA2012/000628, filed Jun. 22, 2012, which in turn claims the benefit of U.S. Provisional Patent Application Ser. No. 61/500,864, filed Jun. 24, 2011, and U.S. Provisional Patent Application Ser. No. 61/599,211, filed Feb. 15, 2012, which applications are incorporated herein by reference in their entireties

FIELD OF THE INVENTION

The present invention relates generally to systems and methods for conducting online video game tournaments, and more particularly to systems and methods for conducting online video game tournaments involving a large number of players.

BACKGROUND OF THE INVENTION

Online video game tournaments are run by companies in the gaming industry. Players typically pay a fee to enter a tournament and then the tournament server sets up a schedule for pairs of players to play matches against each other. This requires that each pair of players scheduled to play a match must play the match at the time indicated in the schedule so that the results are reported back to the tournament server by a fixed time specified in the schedule. The winner of a match goes on to play the winner of another match at another time specified by the tournament server. Such scheduled times may not be convenient or practical for the players to play a match. Such approaches fix players to schedules that may result in fewer players entering because of their time constraints and/or may result in player frustration because they have to modify their plans to adapt to the tournament schedule.

In other systems, players may accumulate points from each match, with the prizes being determined by the number of points each player accumulates in a fixed number of games scheduled by the tournament server.

To date, online video game tournaments have been run with several hundred to several thousand players. Yet these systems suffer from several problems that make running very large tournaments, such as with hundreds of thousands or a million players, online impractical.

Tournaments typically require a pre-determined number of entrants so that the prize pool can be predicted and the players scheduled. This presents the problem that the tournament cannot start unless there are enough players to match the structure of the tournament, and guarantee a prize of a certain amount. For example, it may be necessary that the number of players be a power of two to ensure each player has an opponent.

Such tournaments that schedule times for matches require the players to be available at a specific time to play. Yet online video game players often want to play immediately, or within a short period after logging into the tournament server. Moreover, the logistics of running an elimination tournament online may only scale to several hundred players, as the time schedule required to support thousands of matches may become unreasonably long. This means all participants in a tournament need to dedicate an increasing amount of time to win a tournament, which escalates with the number of participants until participating is impractical for many players.

Some tournaments require the players to schedule their matches themselves. In this case the logistics of negotiating suitable match times between players adds time to the tournament process, making the time to complete the tournament variably longer for some other players. For example, players who win their match and promptly proceed to the next match might have to wait a significant amount of time for the outcome of the match that is to determine the player's opponent.

Players who perceive their skill to be higher than other participants may feel burdened by having to play many matches against players of inferior skill, which they may feel to be a waste of time and not enjoyable. Online tournaments generally only allow for a linear path, requiring them to play multiple weaker players in the early rounds for example, to win the grand prize, so that this may deter strong potential participants. Conversely, players with lower skill may feel they have no chance to win a tournament with significantly better players participating.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention is a system and method for conducting online video game tournaments involving a series of levels. The system comprises a tournament server connected to a communications network that is in electronic communication with remotely located players who register for the tournament. The server maintains a record of registered players competing in the tournament indicating at which level each player is eligible to play and, after players indicate they are ready to play a match, the server matches players who are ready to play at the same level. This matching may be repeated at regular intervals. After being matched, players play a match and the results are reported back to the server which may award prizes or allow players to unlock other levels based on the results. In general, a player who wins a pre-defined number of matches in a row wins a grand prize.

A system is disclosed for conducting a tournament having a plurality of levels, starting with a first level and ending with a last level, and involving a plurality of competing players, the system comprising a tournament server connected to a communications network and in electronic communication with the players through player devices connected to the communications network, wherein the players connect to the tournament server via the player devices and register to compete in the tournament, and wherein the tournament server:

a. maintains a record of competing players for the tournament indicating at which level each player is eligible to play;

b. receives indications from the players that they are ready to play a match and maintains a ready list for each level listing players ready to play a match who are eligible to play at that level;

c. matches players on each ready list, informs the matched players of the match, and removes the matched players from the ready list;

d. receives the results of each completed match and analyzes the results to determine whether each player won or lost the match;

e. updates the record of competing players to indicate that a winning player is eligible to play at a higher level when the player wins a match that is not at the last level; and f. awards a grand prize to a winning player when the player wins a match at the last level.

The players may play the matches on the player devices.

The tournament server may attempt to match players on each ready list at pre-determined intervals, or may attempt to match players on the ready list for a level when a pre-determined number of players eligible to play that level are on the ready list.

The tournament may start and end at pre-determined times.

The tournament server may accept registrations of players until a cut-off time.

Each player may pay a fee to register to compete in the tournament and become eligible to play a match at the first level.

The tournament server may remove the losing players from the record of competing players. A losing player who has previously won a match at a pre-determined level may be awarded a prize.

When a player loses a match at a pre-determined level, the tournament server may update the record of competing players to indicate that the losing player is eligible to play at a lower level.

The tournament server may allow a player to register to compete in the tournament and become eligible to play a level above the first level for the payment of a fee.

A player who has won a pre-determined level that is not the last level may be given the option of receiving a prize and leaving the tournament, and if the player accepts the option, then the tournament server may remove the player from the record of competing players.

The players may play the match on a hosting network connected to the communications network, and the results of each match may be transmitted to the tournament server by the hosting network over the communications network.

The tournament server may record a skill rating for each player, and match players based on their skill ratings.

The tournament server may maintain a record of players' results over multiple tournaments and compute a player's skill rating based on the player's results in prior tournaments. The players may be matched with players having a comparable skill rating.

The tournament server may restrict the registration of players for the tournament based on the geographic location of the players. The tournament server may restrict the registration of players for the tournament based on the players' skill ratings.

The tournament may comprise a plurality of rounds, each round comprising a pre-determined number of levels and a player may be promoted to play in a higher round after winning the last level of a prior round.

The tournament server may further provide a syndication feed that summarizes the state of the tournament.

In addition, a method for conducting a tournament on a tournament sever is disclosed, the tournament having a plurality of levels, starting with a first level and ending with a last level, and involving a plurality of competing players, the tournament having an end time, the method comprising the steps of:

a. maintaining a record of competing players for the tournament indicating at which level each player is eligible to play;

b. receiving indications from the players that they are ready to play a match and maintaining a ready list for each level listing players ready to play a match who are eligible to play at that level;

c. matching players on each ready list, informing the matched players of the match, and removing the matched players from the ready list;

d. receiving the results of each completed match and analyzing the results to determine whether each player won or lost the match; and e. for each winning player, if the winning player won a match at the last level, awarding a grand prize to the winning player or, if the winning player has not won a match at the last level, updating the record of competing players to indicate that the winning player is eligible to play at a higher level;

wherein the steps are repeated until the end time of the tournament.

The method may further comprise a first step of accepting registrations of players until a cut-off time.

The method may perform the matching of players at pre-determined intervals, or may perform the matching of players for a level when a pre-determined number of players is on the ready list for the level.

BRIEF DESCRIPTION OF THE DRAWINGS

FIG. 2 is an example of a screen generated by the tournament server to show the progress of one player in a tournament.

DETAILED DESCRIPTION

According to one embodiment of the present invention, a system and method for conducting a distributed electronic video game tournament for a particular video game, the tournament involving a series of levels, as described herein. The system supports a plurality of remotely located players competing against each other in a video game via a wide area communications network, such as the Internet. A tournament has levels, starting with a first level and ending with a last level. A player starts at the first or an intermediate level and progresses to a higher level each time the player wins a match. A player who wins a match at the last level wins a grand prize.

Figure 3:
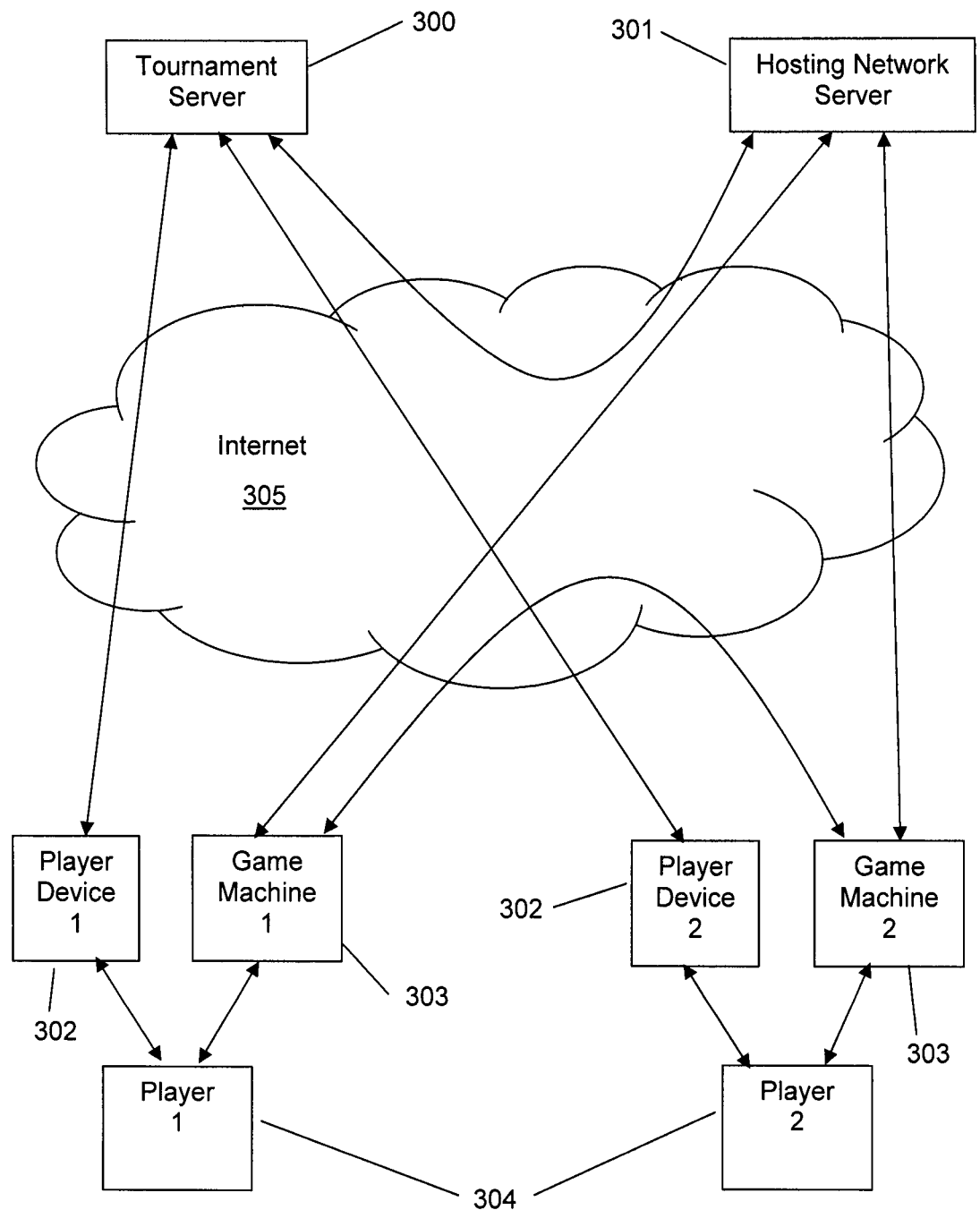
FIG. 3 is a depiction of two players each using a player device and a game console communicating with a tournament server and hosting network server, respectively, via the Internet.

The video games may be played using game machines 303, or game consoles, as depicted in FIG. 3, such as Xbox 360™ and Playstation 3™, where the game machines 303 are connected via hosting networks, or directly connected via a peer-to-peer connection, so that two or more remotely located players can play (or compete) against each other. The game machines 303 may be any machines capable of playing the game that is the subject of the tournament. Such machines include PCs and handheld devices and could also include virtual machines running on servers via the internet that can be accessed and controlled via player devices 302, although for performance reasons game machines 303 are generally co-located with the players. Generally the players use the same type of game machine 303, although this is not necessary.

The players may compete in a video game such as Madden NFL 12 that is the subject of the tournament. Tournaments may be constructed around any suitable video game as long as it supports matches of at least two players that have a defined or definable endpoint, and generates results at the endpoint that can be analyzed to determine whether a player won or lost the match. Such games are generally games of skill for which the skill of a player can be measured or estimated and represented as a skill rating. Most games have a natural endpoint, such as the completion of a football game, but in some cases alternate endpoints may be selected for which suitable results can be obtained.

A hosting network, such as Microsoft Corporation's Xbox Live™, allows players to play online video games with other players logged into the hosting network via the Internet using a unique username. Typically, a hosting network provides a graphical user interface that allows two players who wish to play a match against each other to find each other. This may be done via a lobby system where players ready to play are listed. After the players find each other they can play a match over the Internet. A hosting network may provide other capabilities, such as computing a numeric skill rating for players based on their history of gameplay for particular video games, which skill rating and related information may be provided to the tournament server 300. It is not necessary that a hosting network be used. Players may use other means to identify each other and connect directly to play a match.

The invention includes a computer-based tournament server 300 as depicted in FIG. 3, running software, to manage the conduct of tournaments. The server may comprise multiple networked physical servers, which are not necessarily co-located, forming a virtual server. The tournament server 300 is connected to the communications network to which players also connect using player devices 302 so that the players are in electronic communication with the tournament server 300. Players may register with the tournament server 300 to set up an account, for example using usernames and passwords. Registered players may then connect to and log into the tournament server 300 via the player devices 302 in order to obtain information on on-going and upcoming tournaments. In embodiments that require players to pay fees to compete and allow players to win prizes of money, each player's account may also have a cash balance. Players may transfer money to their account, for example, electronically using a debit or credit card.

The tournament server 300 may record various information about each player and store it in association with the player's account. This could include, for example, player name, preferences, demographic data (such as age, gender and address or other geographic location information), and results of that player's prior gameplay in tournaments conducted by the tournament server 300. Some information may also be obtained about the player from other systems, such as the player's skill rating for certain games from a hosting network server 301.

A player device 302 may be any device that can communicate electronically with the tournament server 300 via the communications network, such as a game machine 303 (e.g. Sony Playstation 3™, Sony PSP™ or Xbox 360™, in which case the player device 302 and game machine 303 are the same device), a personal computer, or a smart phone that supports an interface compatible with the tournament server 300. Generally this requires the device to provide an Internet browser capability. FIG. 3 depicts an example scenario where each player 304 is using a separate player device 302 and game machine. The players 304 use the player devices 302 to communicate over the communications network, which in this case in the Internet 305, with the tournament server 300, and then play a game against each other on their game machines 303, which is coordinated by a hosting network server 301.

A tournament is typically conducted during a fixed time window so that the tournament starts and ends at pre-determined times. A player may register for a specific tournament, which generally requires paying a fee that is accepted and processed through an autonomous payment system. A major advantage of the invention is that, in general, players may register for a tournament while the tournament is running and players have already started to compete, as is described below. In general, the number of players who can register for a tournament does not need to be limited. A tournament may run, for example, for a month, or until a certain number of grand prizes are awarded.

In some embodiments, the tournament may have a cut-off time for registration, which is a time prior to the end of the tournament after which the tournament server 300 will not allow any additional players to register to compete in the tournament. The cut-off time could be, for example, a time that leaves approximately enough time prior to the end of the tournament for a player to play a match at every level. The cut-off time could be the start time of a tournament, although this is not preferred. Alternatively, the cut-off time could be determined dynamically based on factors such as the number of players currently competing, the amount of time remaining until the end of the tournament, the number of grand prizes awarded, and the total amount of prizes awarded. The cut-off time may be calculated based on the end time of the tournament even if the end-time is not pre-determined, by the tournament server 300 predicting the end time based on the current state of the tournament.

In one embodiment, where the tournament has a fixed number of levels, winning the tournament requires a player to win a pre-defined number of matches in a row by playing a series of opponents in a specific video game in order to win a grand prize. In some cases, the number of grand prize winners (or tournament winners) may be fixed, but generally it may vary. In a tournament that is time limited, the number of grand prize winners is not limited. Another tournament may be constructed to run until, for example, there are 100 grand prize winners. A basic one round tournament has a pre-determined number of levels, such as 10, in which case a player must win a match at level 10 in order to win a grand prize. ("Winning a level" is equivalent winning a match at that level.) This may be done, for example, by the player entering at level 1, and winning 10 games in a row whereby each of the first nine wins advances the player to the next higher level.

A grand prize does not necessarily mean a large prize. For example, a tournament might have only two levels where players can buy into level 1 for $15 and win a grand prize of $42.24 for winning matches at both levels 1 and 2. In some cases, there may be no prizes other than grand prizes.

When a player registers to compete in a tournament, the tournament server 300 makes an entry for that player in a record of competing players specific to the tournament. If the player pays the minimum fee, the player may enter the tournament at level 1, and the tournament server 300 records the fact that the player is eligible to play a level 1 match in the record of competing players. The tournament server 300 may give the player the option to enter the tournament at a higher level, in exchange for the payment of a higher fee, or based on a right that has been granted to that player through play in the current tournament, play in a prior tournament or otherwise. The tournament server 300 maintains the record of competing players to indicate at which level each player is eligible to play. The tournament server 300 removes players from the record of competing players who have left the tournament as the tournament progresses.

Figure 1:
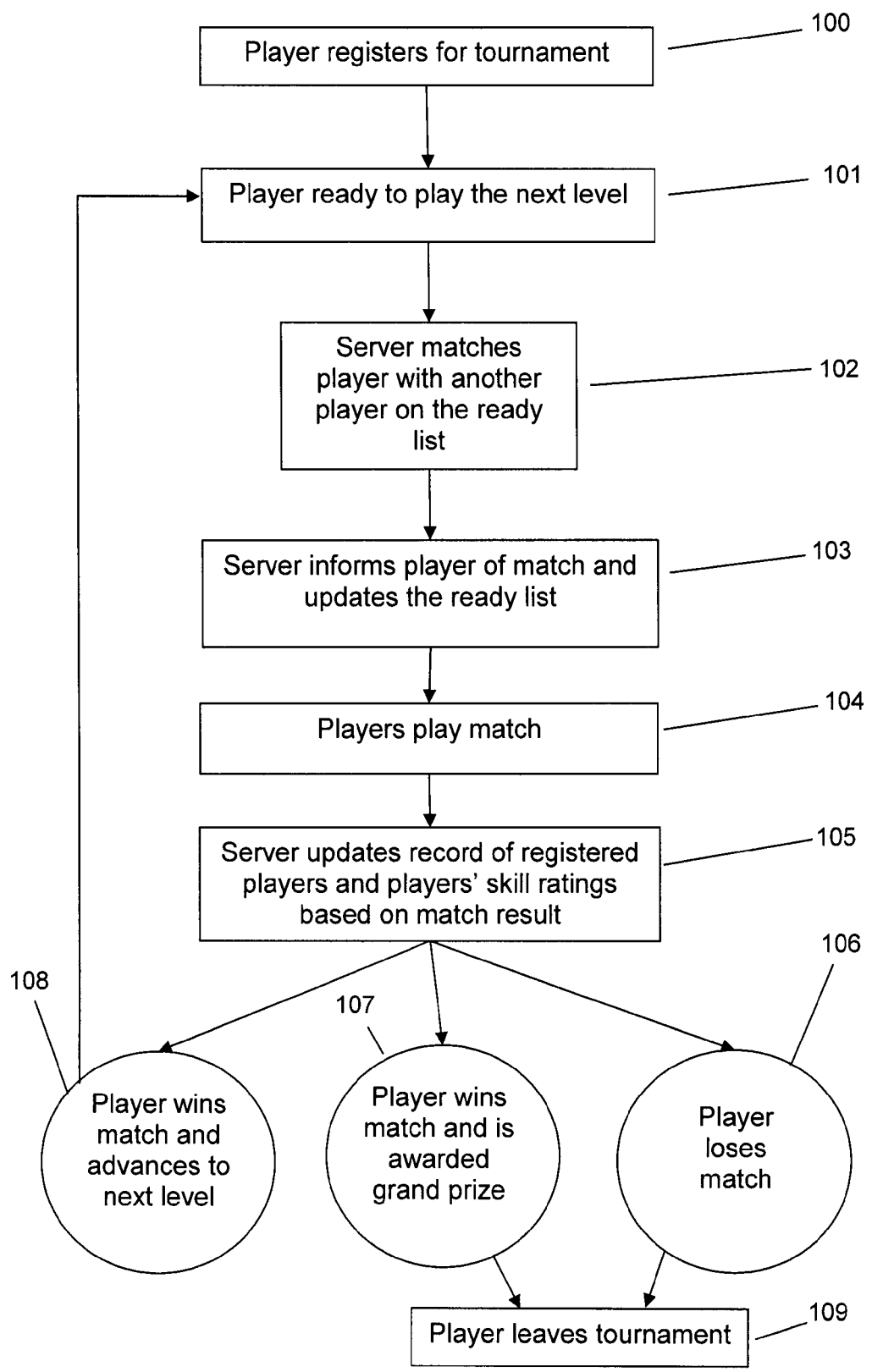
FIG. 1 is a depiction of the flow of a basic tournament for a player showing three possible end conditions for each level.

The steps for a player progressing in a basic tournament are depicted at a high level in FIG. 1. After the player registers for a tournament 100, and when that player is ready to play a match against an opponent, the player indicates or signifies that the player is ready to play the next level 101 (i.e. the level that the player is currently eligible to play). For example, the tournament server 300 may provide a customized screen to each player showing the player's current status in the tournament, which may display information such as how many more games that player must win in a row in order to win a grand prize. That screen may also contain a button indicating that the player is ready to play the next level. When the player so informs the tournament server 300 by clicking on the button, the tournament server 300 may place the player in a ready list for the level that the player is eligible to play. In general, the tournament server 300 maintains one ready list for each level of an on-going tournament listing all players who have registered for the tournament and who are currently eligible to play a match at that level.

The tournament server 300 may allow a player to withdraw from a ready list for some fixed period after pressing the button, e.g. for 10 seconds, in case the player pressed it by mistake. Otherwise, the player may be required to stay in the ready list for at least a certain period. After that amount of time, the player may have the option of withdrawing from the ready list, or the player may be automatically withdrawn. That period may be one matching cycle, as described below, if matching is done periodically, or may simply be a fixed period such as 30 minutes, which may vary with time of day or indicators of player availability, such as the number of players entering the ready lists in the last 10 minutes. This allows players to limit the amount of time they must wait to obtain a match, but they can come back at any time the tournament is still running and re-enter the ready list.

After the tournament has started, the tournament server 300 may process each ready list periodically to match players. This may be done at pre-determined intervals for each level. For example, it may process each ready list every 15 minutes, although this may vary by time of day and day of the week, for example, so that the pre-determined intervals may be a function of the time and day as well as the level. The ready lists for lower levels, generally having more players than those for the higher levels, may be processed more frequently than the ready lists for the higher levels. Alternatively, the ready lists may only be processed when they have at least a pre-determined number of players in them.

The tournament server 300 processes each ready list to attempt to match up each player with another player on the ready list 102 to compete against each other in a match. Such matching may be done in various ways. It may be done randomly or players may be matched with another player based on having similar skill ratings for example. By matching based on skill ratings, players of any skill rating are more likely to have a competitive game, which may make the matches more enjoyable for them. The matching algorithm may also take into account whether players have already played each other in the tournament, and may not match such players.

In embodiments where matching is done randomly and players are not excluded from playing the same opponent more than once, players may be matched as soon as there are two players in a ready list, in embodiments where matches involve only two players (or as soon as N players are in a ready list in the case of embodiments where matches involve a number ("N") of players greater than two). In this case, each ready list is simply a queue of zero to two players that is reduced to zero players each time a second player enters and is immediately matched with the first player. This is a version of the approach described above where ready lists are processed when they have at least a pre-determined number of players in them, the pre-determined number being two in this case.

In some embodiments, each ready list may consist of one or more players at a given level who are ready to play and waiting to be challenged. In that case, the tournament server 300 may present a list of suitable opponents to a new challenger, who may then select an opponent (the "challenged player") to challenge and play (thereby indicating readiness to play a match) and the challenger and opponent may then immediately be matched and removed from the ready list. In this case, the challenger may be considered to be in the ready list only momentarily while the challenge is being transmitted to the opponent and accepted, the issuance of the challenge being an indication that the challenger is ready to play a match.

The tournament server 300 may determine the skill rating of players in various ways. In particular, the tournament server 300 may retain a record of results and outcomes of all matches over multiple tournaments played by player. A very simple measure of skill for a particular game may be the percentage of matches of that game won by the player in the last six months. A more advanced approach may take into account the skill ratings of opponents in each match. A skill estimate may also in some instances be provided by a hosting network on which the player has played a number of matches of the game. The results of a player for similar games, such as an earlier version of the same game could also be used in calculating a skill rating.

The matching of players based on skill rating may be done, for example by sorting the list of players on a ready list by skill, and matching each successive pair in the list. In order to ensure that players matched have comparable skill, a further requirement may be imposed to require that the skill ratings of two matched players are comparable, e.g. that they differ by less than a pre-defined amount. For example, the difference between the skill ratings of the two players may be required to be less than 10% of the skill rating of the skill rating of the player with the lower skill rating.

In contrast, a seeding approach could be used where players of higher skill rating are matched against players of lower skill rating, as is done in a typical seeded tournament. In general this approach is not favored as it results in less competitive matches.

After matching two players, the tournament server 300 informs the players of the match (e.g. on their tournament screen and optionally by email or texting) and updates the ready list 103 to remove those matched players from the ready list. This process generally continues until no more matches can be made (e.g. there is only one person left in a ready list, or the remaining people are deemed to be too different in skill rating or otherwise incompatible) and the remaining players in the list are processed during the next matching cycle. Such remaining players may be given priority in matching in the next cycle. Such players may also be given the option to withdraw from the ready list.

In some cases, after informing players of a match, the tournament server 300 may give each player a certain specified amount of time to decline the match. If one player declines, the opponent of the declining player will be informed of this and put back in the ready list, although the player may be given the option of not being put back into the ready list. If neither player declines within the specified period, then the match is set. After the match is set, the players play the match 104, e.g. on a hosting network. The players may be required to complete the match within a certain time frame, such as two hours after the match is set.

The results of the match may be automatically transmitted to the tournament server 300 by the hosting network over the communications network. Alternatively, the players may be required to report the results by other means.

If no results are received within the required time window, the problem would be resolved by other means. For example, the tournament server 300 may generate a support ticket to initiate a manual investigation, during which time the players will not be eligible to play another match. Such situations, which may involve one player not cooperating, may be mediated by customer support personnel.

The results of a match may simply indicate which player won and which player lost, but they may also include various game statistics that can be analyzed by the tournament server 300 to determine the outcome of the match. In general, the tournament server 300 will determine that one player won the match and the other player lost the match. In some cases, it may determine that the match did not meet pre-determined criteria required to declare a winner, and either require one or both players to replay the level, or allow one or both players to advance to a higher level based on the analysis of the results. For example, the rules of a tournament could require that the winner complete certain in-game objectives, achieve a certain minimum number of points, or win the game by at least a pre-determined margin in order to advance.

The tournament server 300 may then update the record of competing players and the players' skill ratings based on the match result 105. There are generally at least three possible outcomes for each player at each level of a basic tournament, as shown in circles 106, 107, 108 in FIG. 1. (There may be additional possible outcomes, as discussed herein, such as winning a lesser prize or a loser being awarded entry into a lower level). A player may lose the match 106 and leave the tournament 109, in which case the player is removed from the record of competing players. A player may win the match and thereby win a grand prize 107 and then leave the tournament 109. This generally occurs when the player has won a match at the highest, or last, level. For example, in a one round tournament with 10 levels, a player winning a match at level 10, which is the last level, may win a grand prize. After the tournament server 300 determines that a player has won a grand prize, the tournament server 300 may ask the player to select between alternatives, such as a cash prize or an entry into a live event (i.e. a live tournament). If cash is selected, the tournament server 300 may directly credit the money to the player's account. Alternatively, the tournament server 300 may award the grand prize by confirming to the player that the player has won a grand prize, and then informing customer support of the win and allowing them to handle the transaction. In general, a player who wins a grand prize leaves the tournament, so that the tournament server removes the winning player from the record of competing players, but this is not essential.

Otherwise, a player may win a match and thereby advance to the next higher level 108. In this case, if the player has just won a level 4 match, for example, the tournament server 300 may update the record of competing players to indicate that the player is now eligible to play level 5. In some embodiments, the analysis of the match results may conclude that the player should be advanced by more than one level, for example if the player won the match by a number of points that is more than a predetermined number, in which case the player may be advanced two or more levels.

In other embodiments, the losing player may be given a consolation prize based on the number of matches previously won by the player in the tournament or based on the highest level won by the player. For example, if the player loses in level 5 of a five level tournament, the player may be awarded a prize of sufficient money to buy back into, or unlock, level 3 of the tournament. The player may be given the option to keep the money or to use it to re-enter the tournament at level 3. The player may also be offered the option to enter an alternate tournament at a particular level. In some cases, players who have advanced to a certain level, such as level 3, may be guaranteed a prize whether the player wins or loses at that level or a higher level. This provides the player with a sense of security by having reached that threshold level.

In other embodiments, a winning player who has won a pre-determined level that is not the last level (and so who has not won a grand prize) may be given the option of receiving a lesser prize and leaving the tournament. The amount of the lesser prize may depend on what level the player won. In some cases, this option may be available to a player who has won at any level other than the last level.

In some embodiments, the tournament server 300 may allow a player to register to compete in a tournament for the payment of a fee, which may be higher than the minimum fee for entry to level 1, and become eligible to play a level above the first level. For example, a player may pay four times the basic fee in order to start at level 3 rather than level 1.

A tournament may be further broken into rounds, each round consisting of a number of levels. For example, in a three round tournament, the first round may have five levels, the second round four levels and the third round one level. A subsequent round may be unlocked by winning a match at the highest level (last level) of the prior round.

The following table lists the entry fees and prizes for an example of a three-round tournament where the tournament operator does not take any portion of the prize pool (such a portion is commonly known as a "rake").

| Round/ Level | Entry Fee Player 1 | Entry Fee Player 2 | Total Prize Pool | Prize Winner | Prize Loser |
|---|---|---|---|---|---|
| ROUND 1 | | | | | |
| Level 1 | 15 | 15 | $30 | Unlock Round 1, Level 2 or $30 | No Prize |
| Level 2 | 30 | 30 | $60 | Unlock Round 1, Level 3 or $60 | No Prize |
| Level 3 | 60 | 60 | $120 | Unlock Round 1, Level 4 or $105 | Unlock Round 1, Level 1 or $15 |
| Level 4 | 105 | 105 | $210 | Unlock Round 1, Level 5 or $180 | Unlock Round 1, Level 2 or $30 |
| Level 5 | 180 | 180 | $360 | Unlock Round 2, Level 1 or $300 | Unlock Round 1, Level 3 or $60 |
| ROUND 2 | | | | | |
| Level 1 | 300 | 300 | $600 | Unlock Round 2, Level 2 or $600 | No Prize |
| Level 2 | 600 | 600 | $1,200 | Unlock Round 2, Level 3 or $1,200 | No Prize |
| Level 3 | 1,200 | 1,200 | $2,400 | Unlock Round 2, Level 4 or $2,100 | Unlock Round 2, Level 1 or $300 |
| Level 4 | 2,100 | 2,100 | $4,200 | Unlock Round 3, Level 1 or $3,600 | Unlock Round 2, Level 2 or $600 |
| ROUND 3 | | | | | |

-continued

| Round/Level | Entry Fee Player 1 | Entry Fee Player 2 | Total Prize Pool | Prize Winner | Prize Loser |
|---|---|---|---|---|---|
| Level 1 | 3,600 | 3,600 | $7,200 | Finalist Live Event Package or $6,000 | Unlock Round 2, Level 2 or $1,200 |

The above table shows the required entry fees for players to enter each level of each round, the total prize pool (being the sum of the entry fees since there is no rake), and the prizes to be awarded to the winner and loser respectively at the completion of a match at each level. In many cases, the prize allows the player to choose between unlocking a higher or lower level or of taking a cash prize and leaving the tournament.

In this example tournament, the basic entry fee to enter at level 1 of round 1 is $15 per player. As shown in the column titled "Winner", the winner of level 1 of round 1 wins the right to play level 2 of round 1, or alternatively to take a $30 prize and leave the tournament. Another player may buy into level 2 of round 1 by paying a fee of $30. The winner of a match at level 2 of round 1 then wins the right to play level 3 of round 1, or alternatively to take a $60 prize and leave the tournament. For levels 3-5, a portion of the prize pool is allocated to the losing player, as shown in the column titled "Loser" in the above table (at para. [0065]). In each case, in this example, the loser is awarded the right to re-enter the tournament two levels lower, or to take an equivalent cash prize.

In this example tournament, a player who pays $15 to enter at level 1 and wins 10 matches in a row would have the option of being given $6,000, or may accept an entry into a live event of comparable value. This cash payout or live event entry may be referred to as a grand prize in this case.

In this example tournament, the tournament server 300 may allow players to buy into any level at any time while the tournament is continuing by paying the fee indicated in the above table (at para. [0065]) for player 1 or player 2, other when the player has been matched with an opponent and the result has not yet been provided to the tournament server 300 or if registration has been cut off. Alternatively, the tournament server 300 may only allow players to buy into particular levels, such as the first level of a round, and which levels these are may vary over time. For example, it may not allow players to buy into any levels in round 1 when the current time is within some pre-determined amount of time prior to the scheduled end of the tournament. If the tournament server 300 is unable to match players at certain levels when it processes a ready list, it may disallow players buying into other levels, at least until matches are found for the previously unmatched players.

For some tournaments, portions of the tournament may be made "exclusive" by not allowing them to be bought into at all. For example, in the tournament described above, and shown in the table at para. [0065], entry of new players into rounds 2 and 3 may be prohibited, so that the only way to get into these rounds is by winning a match at level 5 of round 1 and level 4 of round 2 respectively. Players may still be able to unlock earlier levels within round 2 as a prize when they lose level 3 or 4 of round 2 though.

The prizes for winners and losers are generally fixed at the start of a tournament, but in some embodiments they may be variable. For example, losers may not be offered a prize to unlock a prior level if the tournament server 300 has cut off new entrants into lower levels, in which case a loser would only be entitled to the cash consolation prize.

In other embodiments, the end time of the tournament may not be fixed. For example, a tournament may run until a pre-defined number of grand prizes are awarded. In the example shown in the table at para. [0065], the tournament might continue until a pre-determined number of winners have won level 1 of round 3 and accepted entry into a live event. In such tournaments, where the end time is not precisely predictable, the prize structure is generally defined so that a winner at any level wins a cash prize or entry into another tournament, so that winners of levels are not deprived of the chance to win a prize by the termination of the tournament (i.e. they can be "prized-out" at any time.).

A tournament may also have a rake so that the tournament operator removes and retains a certain amount of the prize pool for each match or level. For example, the operator may take 15% and adjust the prizes paid out accordingly.

In some embodiments, the registration of players for a tournament may be restricted. In general a set of criteria for player eligibility to enter may be defined, and the tournament server 300 may then check to see whether a player meets those criteria. If the player does not, the player is not allowed to register for the tournament. For example, for certain tournaments, entry may be restricted to particular geographic locations or regions, or may be restricted to a certain range of skill ratings. Other variables such as age or a reputation score could also be used, and the criteria for entering a tournament could involve multiple variables (e.g. one tournament may be limited to females from Canada who have a skill rating of at least a certain level.)

The system may also include a syndication component that tracks the state of all players participating in a tournament and provides an on-going summary of the state of the tournament. It may produce a human and machine readable "feed" of data that shows all participants and their progression state within the tournament, the tournament being identified by a unique ID. This syndication feed may be provided to external parties to consume, so that they can, in effect, show the tournament "live" on other Internet based systems. The progression state for a player may include, for example, a list of all levels/rounds played, who they were played against and the results/outcome of each match. It may also indicate if the player is still competing in the tournament and, if so, what level the player is eligible to play and, if the player is currently playing or a match has been set, the level that is being played and the opponent. If the player is finished and has withdrawn or been removed from the tournament, it may include the amount of a prize, if any, that the player won. The syndication feed may periodically (such as every time another player wins a grand prize) broadcast a list of all players to date who have won a grand prize and state how many grand prizes remain to be won if the total available is limited.

Other sites may be able to query the syndication feed by specifying a tournament ID and, optionally a round number. For example, the using a browser to access a URL such as http://services.<operator>.com/feeds/tournament/<tournament ID>/feed.xml may cause the browser to display summary information such as:

| | |
|---|---|
| Series Name | The friendly name of this series tournament. |
| Game Title | The gameid for the title this series tournament applies to. |
| Rounds | The number of rounds configured for this series. |
| Max Winners for final round | NULL if this isn't set. Otherwise provides an integer of the max number of winners. |

| | |
|---|---|
| Total Winners for final round | NULL if Max winners isn't set for this tournament. Otherwise provides an integer of the actual number of winners for the round. |
| Date/Time range | The date/time this series tournament ends. |
| Total current participants | The total number of players actively playing in the series, across all rounds. |

Similarly, the URL http://services.<operator>.com/feeds/tournament/<tournament ID>/round2/feed.xml may return summary information such as the following, for each player playing that round:

| | |
|---|---|
| Total Round 2 Participants | A grand total of the number of participants currently in this round. |
| Player Enumeration | A row for each player in the round. |
| Player | The player screen name |
| Current Round | The current round for that player. |
| Round participation | For each round, a count of all rounds participated in. |
| Last Match Screen Name | Name of the player's last opponent. |
| Last Match Play Time | Date/Time of the player's last opponent. |
| Longest Win Streak | The longest wins in a row. |
| Won Final round | Indicates if player won the final round. |

The tournament server 300 may provide various information screens for players to view the progress of the tournament. These could include information that is also in the syndication feed. Summary data, such as the number of players eligible to play each level, and currently playing a match at each level, may be displayed. The number of winners for each prize level (where players have accepted a prize and left the tournament) may also be shown with the total number of grand prize winners, and the remaining number of available grand prizes (in cases that the number is limited).

FIG. 2 shows an example of a screen that may be displayed to a player to show that player's progress in a tournament. During an actual tournament, the Date/time field 208 would increase from the top of the screen to the bottom of the screen to show the time that each of a series of events took place. In this example, the player initially paid an entry fee and joined the tournament 209 at level 1, and was defeated in level 1 by fred 200. The player later rejoined the tournament 201 at level 1 (by paying another entry fee), and was matched against john 202, whom the player defeated 203 to unlock level 2 204. Later, after unlocking level 3 205, the player lost a match at level 3 to Brad 206, and was awarded the right to unlock level 1 207 as a consolation prize.

Although tournaments of individual players have been described, the "players" may be teams, where a team is made up of a number of individual players. In that case, teams may register for tournaments and be matched against other teams. This could also be done on the basis of skill. An initial estimate of the skill of a team could be based on the skill ratings of the individual players who make up the team, and skill ratings could be calculated from the historical gameplay of a team.

Although the invention has been described with respect to pairs of competing players, it may be extended, as will be evident to skilled persons, to matches involving more than two players. In some such embodiments, there will be one winner of each match and all the other players will be losers. In other embodiments, there may be a pre-determined number, or percentage, of winners in each match, which may vary by level.

The tournament server 300 may run an HTML web server, such as Apache, to provide an interface to players using a web browser via the Internet. The tournament server 300 generally comprises one or more programmable computer processors running software to implement the functionality of an embodiment. The software may include executable code stored in a non-transitory computer-readable memory or medium for execution by a processor. This excludes transitory propagating signals. Such a memory may include any static or dynamic memory or storage medium, including without limitation read-only memory (ROM), programmable ROM, random access memory (RAM), semiconductor registers or magnetic, optical or electronic storage media, or other physical device or means that can contain or store a computer program for use by or in connection with a computer processor.

Although the invention has been described as involving the exchange of money, it will be understood that this could equally well refer to points or credits. New players could be granted a certain number of points and use those points to enter tournaments and earn more points. The operator could, for example, offer prizes that can be obtained by redeeming points. Tournaments could also be created that require no fee to buy in at the first level, but which would permit players to win points based on how far they advance through the tournament.

Although the invention has been described by way of example embodiments having a fixed number of levels, skilled persons will appreciate that it is not necessary that the number of levels be fixed or pre-determined. For example, in order to encourage players to enter a tournament early, one or more levels could be added at pre-determined times, such as at the half-way point for a tournament with a fixed duration, or when half of the available grand prizes have been awarded for a tournament with a fixed number of grand prizes.

Any functions of the tournament server 300 or other computer-implemented processes described herein should be understood as representing modules of computer software code including executable instructions for implementing specific logical functions or steps in the process. Variations may be possible that achieve the same result, as will be apparent to a skilled person, such as modifications in the order of performing operations within a module.

In some cases, actions ancillary to the system may be carried out by people who may be part of the tournament operator's customer support, marketing or other departments. These ancillary actions are not part of the system. The generation of instructions for these people to perform the ancillary actions is part of the system. For example, a prize may be awarded by the tournament server 300 by confirming to a player who has won, and elected to receive (if applicable), that prize that the player has in fact won the prize. This may be implemented, in some embodiments, for some awards of prizes, by the tournament server 300 instructing customer service to effect the transfer of the prize to the player. Actions by such personnel are not considered to be part of the award of the prize as the word "award" is used in this document.

A gaming system may directly incorporate software to provide an embodiment of the present invention. Access to tournaments may then be provided in-game, for example, via an XBOX Live app, or online via a laptop, desktop, tablet, smart phone or other mobile browser or app interface. One of the menu items may provide an option to play tournaments. Once that option is selected, the game console may display various options for entering such tournaments. The game console may display statistics about potential matchups, and display the outcome of the match after it has been played.

The player devices, tournament servers and game consoles referred to herein are generally computer systems comprising one or more programmable computer processors running software adapted to perform the functions described herein.

Generally, a computer, computer system, computing device, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the items, and alternatives to the items, in the list that a skilled person would understand would be suitable for the purpose that the items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A system for conducting a tournament having a plurality of levels, starting with a first level and ending with a last level, and involving a plurality of competing players, the system comprising a tournament server connected to a communications network and in electronic communication with the players through player devices connected to the communications network, wherein the tournament server is separate and remote from game machines on which the players play matches, and wherein the players connect to the tournament server via the player devices and register to compete in the tournament, and wherein the tournament server:
   a. maintains a record of competing players for the tournament indicating at which level each player is eligible to play;
   b. receives indications from the players that they are ready to play a match and maintains a ready list for each level listing players ready to play a match who are eligible to play at that level;
   c. matches pairs of players on each ready list, informs the matched players of the match, and removes the matched players from the ready list;

d. receives the results of each completed match and analyzes the results to determine whether each player won or lost the match;
e. updates the record of competing players to indicate that a winning player is eligible to play at a higher level when the player wins a match that is not at the last level; and
f. awards a grand prize to a winning player when the player wins a match at the last level wherein each pair of matched players comprises two players who are selected to compete against each other in a match and wherein the matched players play the match using their game machines independent of the tournament server.

2. The system of claim 1 wherein the system presents to a challenger, who is a player, a list of other players on the ready list, and allows the challenger to challenge one of the listed players, whereby the system matches the challenger with the challenged player.

3. The system of claim 1 wherein the players play the matches on the player devices, which comprise the game machines.

4. The system of claim 1 wherein the tournament server attempts to match players on each ready list at pre-determined intervals.

5. The system of claim 1 wherein the tournament server attempts to match players on the ready list for a level when a pre-determined number of players eligible to play that level are on the ready list.

6. The system of claim 5 wherein the pre-determined number of players is two.

7. The system of claim 1 wherein, when a player loses a match at a pre-determined level, the tournament server updates the record of competing players to indicate that the losing player is eligible to play at a lower level.

8. The system of claim 1 wherein the tournament server allows a player to register to compete in the tournament and become eligible to play a level above the first level for the payment of a fee.

9. The system of claim 1 wherein the players play the match on a hosting network connected to the communications network, and the results of each match are transmitted to the tournament server by the hosting network over the communications network.

10. The system of claim 1 wherein the tournament server records a skill rating for each player, and matches players based on their skill ratings.

11. The system of claim 10 wherein the tournament server maintains a record of players' results over multiple tournaments and computes a player's skill rating based on the player's results in prior tournaments.

12. The system of claim 10 wherein the players are matched with players having a comparable skill rating.

13. The system of claim 10 wherein the tournament server restricts the registration of players for the tournament based on the players' skill ratings.

14. The system of claim 1 wherein the tournament comprises a plurality of rounds, each round comprising a pre-determined number of levels and wherein a player is promoted to play in a higher round after winning the last level of a prior round.

15. A method for conducting a tournament on a tournament sever comprising a computer processor, the tournament server being separate and remote from game machines on which the players play matches, the tournament having a plurality of levels, starting with a first level and ending with a last level, and involving a plurality of competing players, the method comprising the steps of:
a. Maintaining, by the tournament sever, a record of competing players for the tournament indicating at which level each player is eligible to play;
b. receiving, by the tournament sever, indications from the players that they are ready to play a match and maintaining a ready list for each level listing players ready to play a match who are eligible to play at that level;
c. matching, by the tournament sever, pairs of players on each ready list, informing the matched players of the match, and removing the matched players from the ready list;
d. receiving, by the tournament sever, the results of each completed match and analyzing the results to determine whether each player won or lost the match; and
e. for each winning player, if the winning player won a match at the last level, awarding a grand prize to the winning player or, if the winning player has not won a match at the last level, updating the record of competing players to indicate that the winning player is eligible to play at a higher level wherein each pair of matched players comprises two players who are selected to compete against each other in a match and wherein the matched players play the match using their game machines independent of the tournament server.

16. The method of claim 15 wherein the tournament has an end time and the steps of the method are repeated until the end time of the tournament.

17. The method of claim 16 further comprising a first step of accepting registrations of players until a cut-off time.

18. The method of claim 16 wherein matching of players is performed at pre-determined intervals.

19. The method of claim 16 wherein matching of players is performed for a level when a pre-determined number of players is on the ready list for the level.

20. The method of claim 16 wherein a list of other players on the ready list is presented to a challenger, who is a player, and the challenger is permitted to challenge one of the listed players, whereby the challenger is matched with the challenged player.

* * * * *